United States Patent
Vajapeyam et al.

(10) Patent No.: US 9,615,336 B2
(45) Date of Patent: Apr. 4, 2017

(54) UPLINK POWER HEADROOM MANAGEMENT FOR CONNECTIVITY WITH LOGICALLY SEPARATE CELLS

(71) Applicant: QUALCOMM Incorporated, San Diego, CA (US)

(72) Inventors: Madhavan Srinivasan Vajapeyam, San Diego, CA (US); Jelena Damnjanovic, Del Mar, CA (US); Wanshi Chen, San Diego, CA (US); Tingfang Ji, San Diego, CA (US); Peter Gaal, San Diego, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/042,467

(22) Filed: Sep. 30, 2013

(65) Prior Publication Data
US 2014/0349701 A1 Nov. 27, 2014

Related U.S. Application Data

(60) Provisional application No. 61/826,923, filed on May 23, 2013.

(51) Int. Cl.
*H04W 52/32* (2009.01)
*H04W 52/36* (2009.01)
(Continued)

(52) U.S. Cl.
CPC ......... *H04W 52/32* (2013.01); *H04W 52/365* (2013.01); *H04W 52/40* (2013.01); *H04W 52/146* (2013.01); *H04W 52/367* (2013.01)

(58) Field of Classification Search
CPC .. H04W 52/365; H04W 52/146; H04W 52/34
See application file for complete search history.

(56) References Cited

U.S. PATENT DOCUMENTS

| | | | | |
|---|---|---|---|---|
| 8,693,362 B2 * | 4/2014 | Damnjanovic | ..... | H04W 52/365 370/252 |
| 2010/0322090 A1 * | 12/2010 | Zhang | ................... | H04W 52/42 370/252 |

(Continued)

FOREIGN PATENT DOCUMENTS

WO 2013025562 A2 2/2013

OTHER PUBLICATIONS

Interdigital Communications: "Power Management PHR Triggering Clarification and Correction",3GPP Draft; R2-113207, Power Management Triggering. 3rd Generation Partnership Project (3GPP), Mobile Competence Centre ;650, Route Des Lucioles ; F-06921SO-PHIA-Antipolis Cedex ; France, vol. RAN WG2, No. Barcelona, Spain;20110509, May 3, 2011,XP050495376,[retrieved on May 3, 2011]the whole document.

(Continued)

*Primary Examiner* — Bobbak Safaipour
(74) *Attorney, Agent, or Firm* — Harrity & Harrity, LLP

(57) ABSTRACT

Power headroom management in uplink carrier aggregation for connectivity with logically separate cells of a wireless communications system is performed by a network entity, alone or in combination with another network entity, one or more mobile entities, or both. This may include determining an uplink power allocation across at least two independently controlled cells of a wireless communication network for a mobile entity served by at least two independently controlled cells of a wireless communication network, subject to a total PH constraint for uplink transmissions by the mobile entity. A network entity may then manage PH reporting for determining the uplink power allocation by the uplink (Continued)

serving cells, based on the determined uplink power allocation. Managing the PH reporting may be performed by at least one of: explicit coordination between the at least two independently controlled cells, implicit coordination between the at least two independently controlled cells, or configuring PH reporting from the mobile entity by at least one of the at least two independently controlled cells.

41 Claims, 11 Drawing Sheets

(51) Int. Cl.
    *H04W 52/40*     (2009.01)
    *H04W 52/14*     (2009.01)

(56) References Cited

U.S. PATENT DOCUMENTS

| | | | |
|---|---|---|---|
| 2011/0026419 A1* | 2/2011 | Kim | H04W 52/281 370/252 |
| 2011/0038271 A1* | 2/2011 | Shin | H04W 52/146 370/252 |
| 2011/0170504 A1* | 7/2011 | Xu | H04L 5/00 370/329 |
| 2011/0310760 A1 | 12/2011 | Wu et al. | |
| 2012/0044882 A1 | 2/2012 | Kim et al. | |
| 2012/0082041 A1* | 4/2012 | Damnjanovic | H04W 52/365 370/252 |
| 2012/0106477 A1 | 5/2012 | Kwon et al. | |
| 2012/0113935 A1* | 5/2012 | Lindoff | H04W 28/04 370/329 |
| 2012/0314640 A1 | 12/2012 | Kim et al. | |
| 2013/0128859 A1 | 5/2013 | Takaoka et al. | |
| 2013/0324182 A1 | 12/2013 | Deng et al. | |

OTHER PUBLICATIONS

International Search Report and Written Opinion—PCT/US2014/039460—ISA/EPO—Sep. 12, 2014.

\* cited by examiner

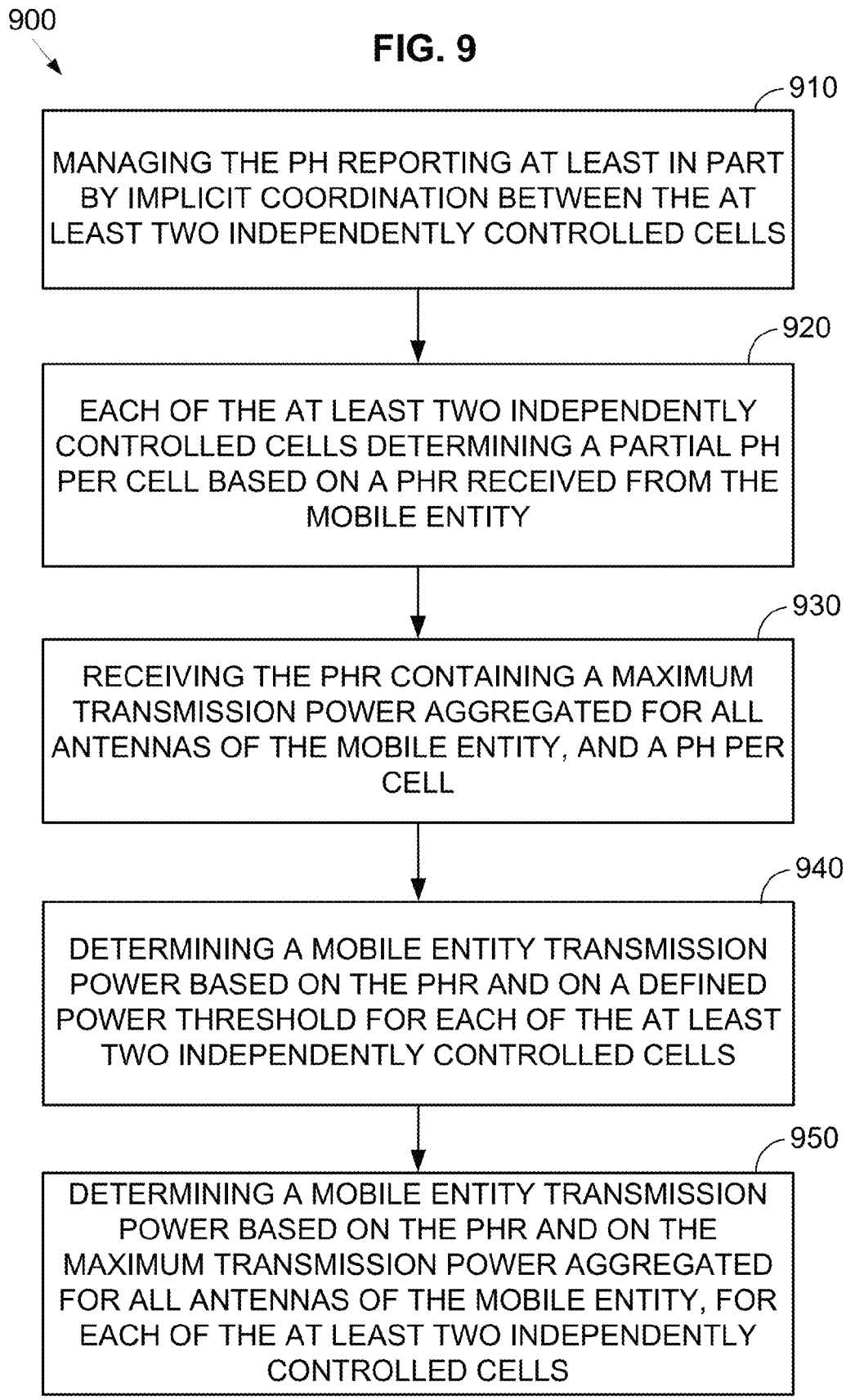

1010: MANAGING THE PH REPORTING AT LEAST IN PART BY CONFIGURING PH REPORTING FROM THE MOBILE ENTITY BY AT LEAST ONE OF THE AT LEAST TWO INDEPENDENTLY CONTROLLED CELLS

1020: THE MOBILE ENTITY MODIFIES THE PHR CONTROL INFORMATION BASED ON A PEAK MAXIMUM POWER REDUCTION (PMPR)

1030: EACH OF THE AT LEAST TWO INDEPENDENTLY CONTROLLED CELLS DETERMINES A MOBILE ENTITY TRANSMISSION POWER BASED ON THE PHR CONTROL INFORMATION

1060: PRIORITIZING ONE OR MORE TRANSMISSION TYPES BY AT LEAST ONE OF ALLOCATING POWER BY TYPE OR EXCEPTING A TYPE FROM A PER CELL PH CONSTRAINT

1070: BASING THE PRIORITIZING ON ONE OR MORE OF CHANNEL TYPE, CONTENT TYPE, OR CELL TYPE

1210 — SIGNALING DATA FROM A MOBILE ENTITY SUBJECT TO A PH CONSTRAINT, USING UPLINK CARRIER AGGREGATION (CA), TO AT LEAST TWO INDEPENDENTLY CONTROLLED CELLS OF A WIRELESS COMMUNICATION NETWORK

1220 — PROVIDING INFORMATION FOR MANAGING UPLINK POWER CONTROL FROM THE MOBILE ENTITY TO EACH OF THE AT LEAST TWO INDEPENDENTLY CONTROLLED CELLS

1310 — PROVIDING THE INFORMATION COMPRISING A MAXIMUM TRANSMISSION POWER PER CELL AND A PH PER CELL

1320 — PROVIDING THE INFORMATION COMPRISING A MAXIMUM TRANSMISSION POWER AGGREGATED FOR ALL ANTENNAS OF THE MOBILE ENTITY

1330 — PROVIDING THE INFORMATION COMPRISING A PH REPORT MODIFIED BY A PEAK MAXIMUM POWER REDUCTION (PMPR) FOR EACH OF THE AT LEAST TWO INDEPENDENTLY CONTROLLED CELLS

1340 — COMPUTING THE PMPR BASED ON A TRANSMISSION POWER OF AT LEAST ONE OF THE AT LEAST TWO INDEPENDENTLY CONTROLLED CELLS

UPLINK POWER HEADROOM MANAGEMENT FOR CONNECTIVITY WITH LOGICALLY SEPARATE CELLS

CROSS-REFERENCE TO RELATED APPLICATION

This application claims priority pursuant to 35 U.S.C. §119(e) to U.S. provisional application Ser. No. 61/826,923 filed May 23, 2013, which is hereby incorporated by reference, in its entirety.

FIELD

The present disclosure relates to wireless communication systems and to techniques for uplink power headroom management for connectivity with logically separate cells of a wireless communications system.

BACKGROUND

Wireless communication networks are widely deployed to provide various communication content such as voice, video, packet data, messaging, broadcast, or other content. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) evolves cellular technology based on Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. UEs may be equipped with multiple transceiver systems for receiving or transmitting data contemporaneously using different carriers, sometime referred to as Carrier Aggregation (CA). Present networks may limit the use of CA for communicating with collocated cells under the control of the same radio network controller (RNC). It may be desirable to overcome these and other limitations of the prior art, and enable a network to realize the benefits of CA in more diverse and varied network configurations or topologies.

SUMMARY

Methods, apparatus and systems for uplink power headroom management for connectivity with logically separate (non-collocated) cells of a wireless communications system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

As used herein, "logically collocated" or "collocated" refers to two or more cells in which a processor or processors perform joint scheduling decisions concerning data transmitted within a Transmission Time Interval (TTI) of the radio link layer. This interval may vary depending on the radio link technology; for example between about 1 ms and 80 ms. Conversely, as used herein, "non-collocated" or logically non-collocated" refers to cooperating cells in which there is no joint scheduling within a TTI interval. Similarly, in logically collocated cells the MAC layers of each cell are jointly controlled, while in a non-collocated case each cell controls its own MAC layer independently. Collocated cells may usually be located at the same base station while non-collocated cells may be located at different base stations. Nonetheless, as used in the specification, "collocated" or "non-collocated" refers only to the foregoing logical distinctions concerning control of the MAC and RL layers, and does not necessarily limit a cell to being within or outside of a particular physical distance or base station of another cell.

In an aspect, a method for uplink power headroom management in uplink carrier aggregation for connectivity with logically separate cells of a wireless communications system may be performed by a network entity, alone or in combination with another network entity, one or more mobile entities, or both. The method may include determining an uplink power allocation across at least two independently controlled cells of a wireless communication network for a mobile entity served by at least two independently controlled cells of a wireless communication network, subject to a total PH constraint for uplink transmissions by the mobile entity. The method may further include managing PH reporting for the uplink serving cells, based on the uplink power allocation across the cells as determined above. Thus, PH reporting in CA with non-colocated cells may be enabled.

In additional aspects of the method, managing PH reporting may be performed by at least one of: explicit coordination between the at least two independently controlled cells, implicit coordination between the at least two independently controlled cells, or configuring PH reporting from the mobile entity by at least one of the at least two independently controlled cells. Explicit coordination may include dedicated signaling for coordination between the two independently controlled cells, while implicit coordination may be performed without dedicated signaling for coordination between the two independently controlled cells. In other aspects, one of the at least two independently controlled cells is a primary cell, and another of the at least two independently controlled cells is a secondary cell. Configuring PH reporting from the mobile entity may include signaling (explicitly or implicitly) from the eNB that informs the mobile entity concerning the type of PHR to provide to the independently controlled cells.

Where the managing PH reporting is performed by the explicit coordination, the method may include the primary cell defining a maximum uplink power value for the secondary cell. In addition, the method may include the primary cell signaling the maximum uplink power value to the secondary cell, via a backhaul.

Conversely, where managing PH reporting is performed by implicit coordination, each of the at least two independently controlled cells may determine a partial PH per cell, based on a Power Headroom Report (PHR) received from the mobile entity. Each cell may infer a desired partial PH per cell, based on the received PHR. The PHR received from the mobile entity may contain information including a maximum transmission power aggregated for all antennas of the mobile entity, and a PH per cell.

In an aspect, each of the at least two independently controlled cells may determine a mobile entity transmission power, based on the PHR and on a defined power threshold. For example, each of the at least two independently controlled cells may determine a mobile entity transmission power based on the PHR and on the maximum transmission power aggregated for all antennas of the mobile entity. In an alternative, each of the at least two independently controlled cells may determines a mobile entity transmission power based on the PH control information without a defined power threshold.

In some embodiments, managing the PH reporting may be performed by each of the at least two independently controlled cells receiving the PH control information from the mobile entity, wherein the mobile entity modifies the PH control information based on a Peak Maximum Power Reduction (PMPR). In such cases, the mobile entity may compute the PMPR based on a transmission power of at least one of the at least two independently controlled cells.

In another aspect, the method may further include prioritizing one of one or more transmission types by at least one of: allocating power by transmission type, or excepting a transmission type from a per-cell PH constraint. The prioritizing may be based on one or more of channel type, content type or cell type.

In other embodiments, a method for PH management may be performed by a mobile entity subject to a PH constraint in carrier aggregation. This method may include signaling data from the mobile entity using uplink carrier aggregation to at least two independently controlled cells of a wireless communication network. The method may further include providing information for managing uplink power control from the mobile entity to each of the at least two independently controlled cells.

In an aspect the information provided by the mobile entity may be, or may include a maximum transmission power per cell and a PH per cell. In an alternative, or in addition, the information may be, or may include, a maximum transmission power aggregated for all antennas of the mobile entity.

In another aspect, the information provided by the mobile entity may be, or may include, a PH report including a PMPR for each of the at least two independently controlled cells. In such case, the method by the mobile entity may further include computing the PMPR based on a transmission power of at least one of the at least two independently controlled cells.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a mobile entity, for example a mobile entity or access terminal. In other embodiments, aspects of the technology may be embodied in a network entity, such as, for example, a base station, eNB, picocell, femtocell or Home Node B. In some aspects, a mobile entity and network entity may operate interactively to perform aspects of the technology as described herein. Similarly, an article of manufacture may be provided, including a computer-readable storage medium holding encoded instructions, which when executed by a processor, cause a network entity or access terminal to perform the methods and aspects of the methods as summarized above.

BRIEF DESCRIPTION OF THE DRAWINGS

FIGS. 8-10B illustrate examples of additional operations or aspects that may be combined with the example methodology illustrated by FIG. 7.

FIG. 12 illustrates an exemplary methodology for performance by a mobile entity in coordination with one or more independently controlled cells performing a methodology for power headroom management, for example a methodology as illustrated by FIG. 7.

FIG. 13 illustrates examples of additional operations or aspects that may be combined with the example methodology illustrated by FIG. 12.

DETAILED DESCRIPTION

Figure 1:
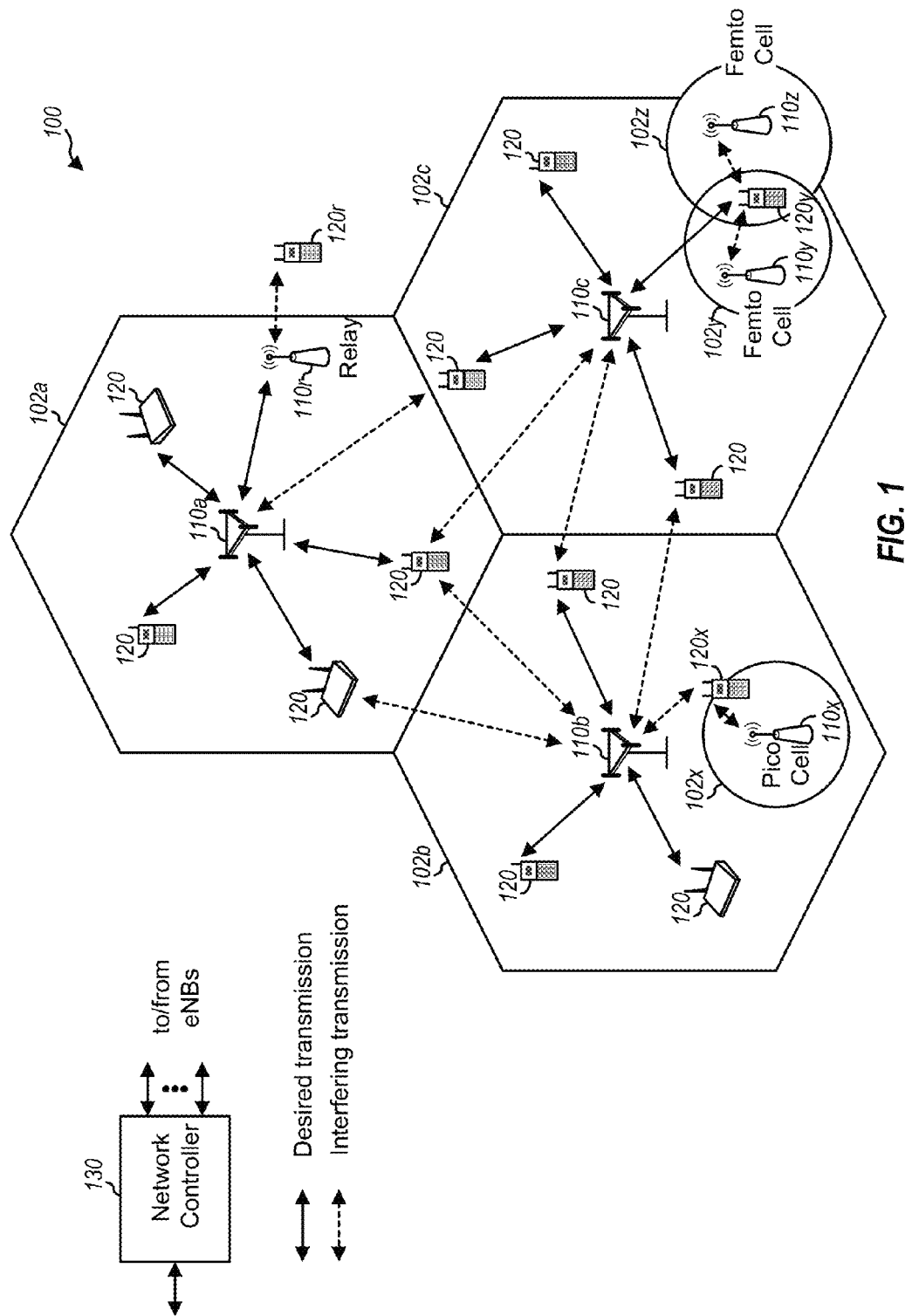
FIG. 1 is a schematic diagram conceptually illustrating an example of a wireless telecommunications system.

Techniques for power headroom management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, or similar technology. UTRA includes Wideband CDMA (WCDMA) and other variants of CDMA. The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, or similar technology. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). The cdma2000 and UMB technologies are described in documents from an organization named "3rd Generation Partnership Project 2" (3GPP2). A WLAN may implement a radio technology such as IEEE 802.11 (WiFi), Hiperlan, or similar technology.

Communicating with non-collocated cells not under control of the same RNC using CA is not supported by present networks, limiting the benefits of CA to the collocated case. Various technical barriers to use of CA with non-collocated cells may exist. It may be desirable, therefore, to overcome such technical barriers to enabling use of CA to communicate with independently controlled cells of a wireless communication system, such as by application of the methods, systems and apparatus disclosed herein. As used herein, non-collocated cells are assumed to be independently controlled, unless specifically indicated otherwise. In LTE, use of multiple carriers to communicate with non-collocated cells may sometimes be referred to as "multiflow." Multiflow may be used by a mobile terminal on the uplink, for example, to send data both to an evolved Node B (eNB) and to a small cell (e.g., femtocell) operating on a different carrier within a coverage area of the eNB, or to two different eNBs on different carriers.

The techniques described herein may be used for the wireless networks and radio technologies mentioned above as well as other wireless networks and radio technologies. For clarity, certain aspects of the techniques are explained in the exemplary context of 3GPP networks, and more particularly in the context of mobile entity power headroom management for such networks. The word "exemplary" is used herein to mean "serving as an example, instance, or illustration." Any embodiment described herein as "exemplary" is not necessarily to be construed as preferred or advantageous over other embodiments.

FIG. 1 shows a wireless communication network 100, which may be an LTE network or some other wireless network (e.g., a 3G network or the like). As used herein, "network entity" specifically excludes mobile entities, UEs, or other end user access terminals. Wireless network 100 may include a number of eNBs 110a-c and other network entities. An eNB may be an entity that communicates with mobile entities (e.g., user equipment (UE)) and may also be referred to as a base station, a Node B, an access point, or other terminology. Although the eNB typically has more functionalities than a base station, the terms "eNB" and "base station" are used interchangeably herein. Each eNB 110a-c may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

A base station may provide communication coverage for a macro cell, a picocell, a femtocell, and/or other types of small cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 110a, 110b, and 110c may be macro eNBs for macro cell groups 102a, 102b, and 102c, respectively. Each of the cell groups 102a, 102b, and 102c may include a plurality (e.g., three) of cells or sectors. A base station 110x may be a pico base station for a picocell 102x. A base station 110y may be a femto base station or femto access point (FAP) for a femtocell 102y, which may have an overlapping or non-overlapping coverage area with an adjacent femtocell 102z of FAP 110z. A macro cell and a small cell may operate on different carriers, may be controlled by different RNCs, and may operate at substantially different power levels. For example, a small cell may be characterized by having a transmit power substantially less (e.g., less than 10%, or less than 5%, of average macro cell power) than each macro cell in a wireless communication network with the small cell. For more detailed example, a macrocell may transmit at a power of about 40 W with a range of a few city blocks, or further in rural areas, while a small cell may transmit at a power in the range of about 1-2 W and have a range of about 100 feet or so.

Wireless network 100 may also include relays, e.g., relay 110r. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 130 may couple to a set of eNBs/base stations and may provide coordination and control for these eNBs/base stations. Network controller 130 may include a single network entity or a collection of network entities. Network controller 130 may communicate with the eNBs/base stations via a backhaul. The eNBs/base stations may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, or similar terminology. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, or similar device. A UE may be able to communicate with eNBs, relays, or other network nodes. A UE may also be able to communicate peer-to-peer (P2P) with other UEs.

Wireless network 100 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB or base station. The eNB or base station may send data and control information on one or more DL carriers to the UE. The UE may send data and control information on one or more UL carriers to the eNB or base station. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 100 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 100 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 100 may support single-user (SU) MIMO, multi-user (MU) MIMO, Coordinated Multi-Point (CoMP), or similar communication mode. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 100 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
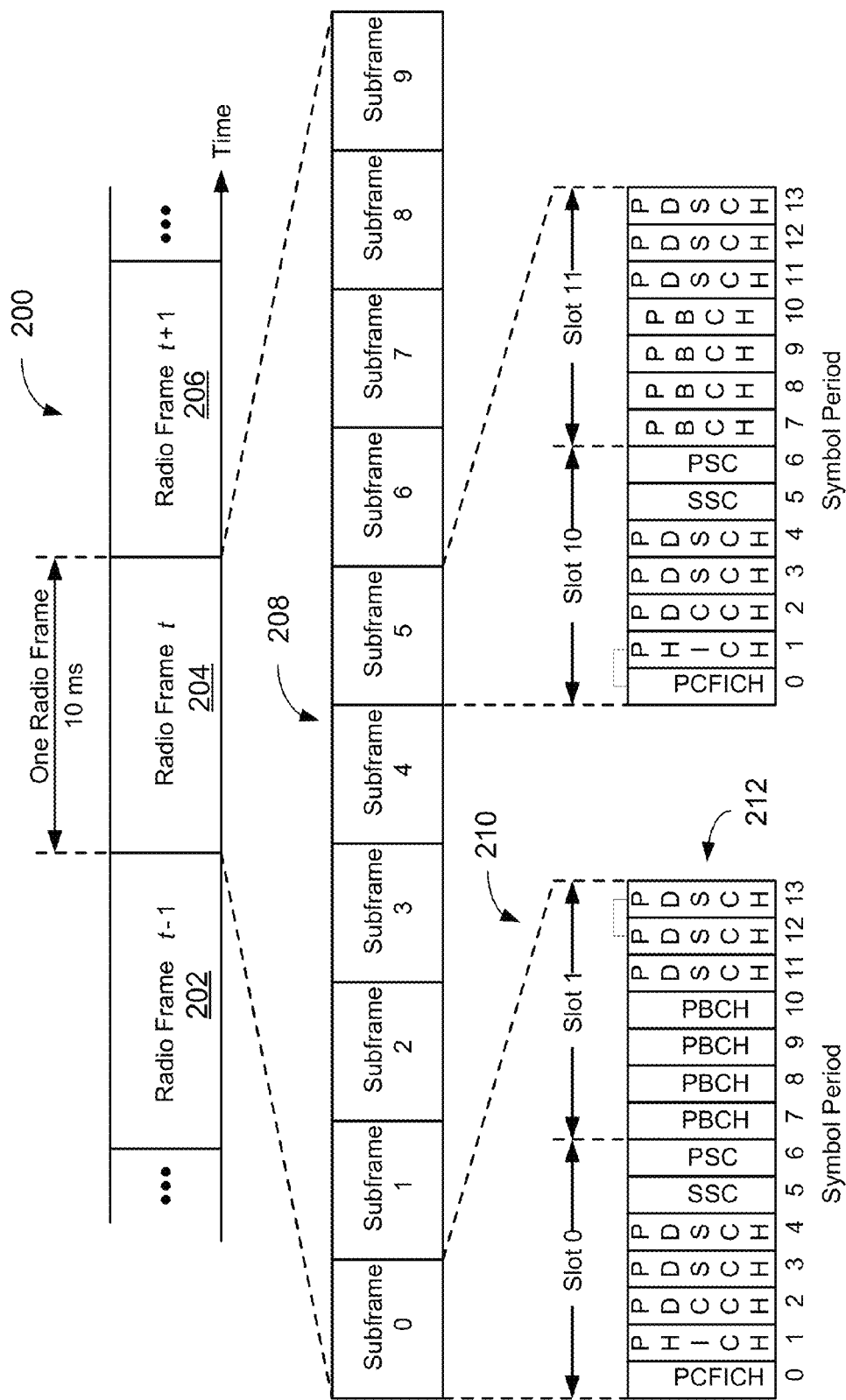
FIG. 2 is a block diagram conceptually illustrating an example of a radio frame and subframe details in a wireless communications system.
Figure 6:
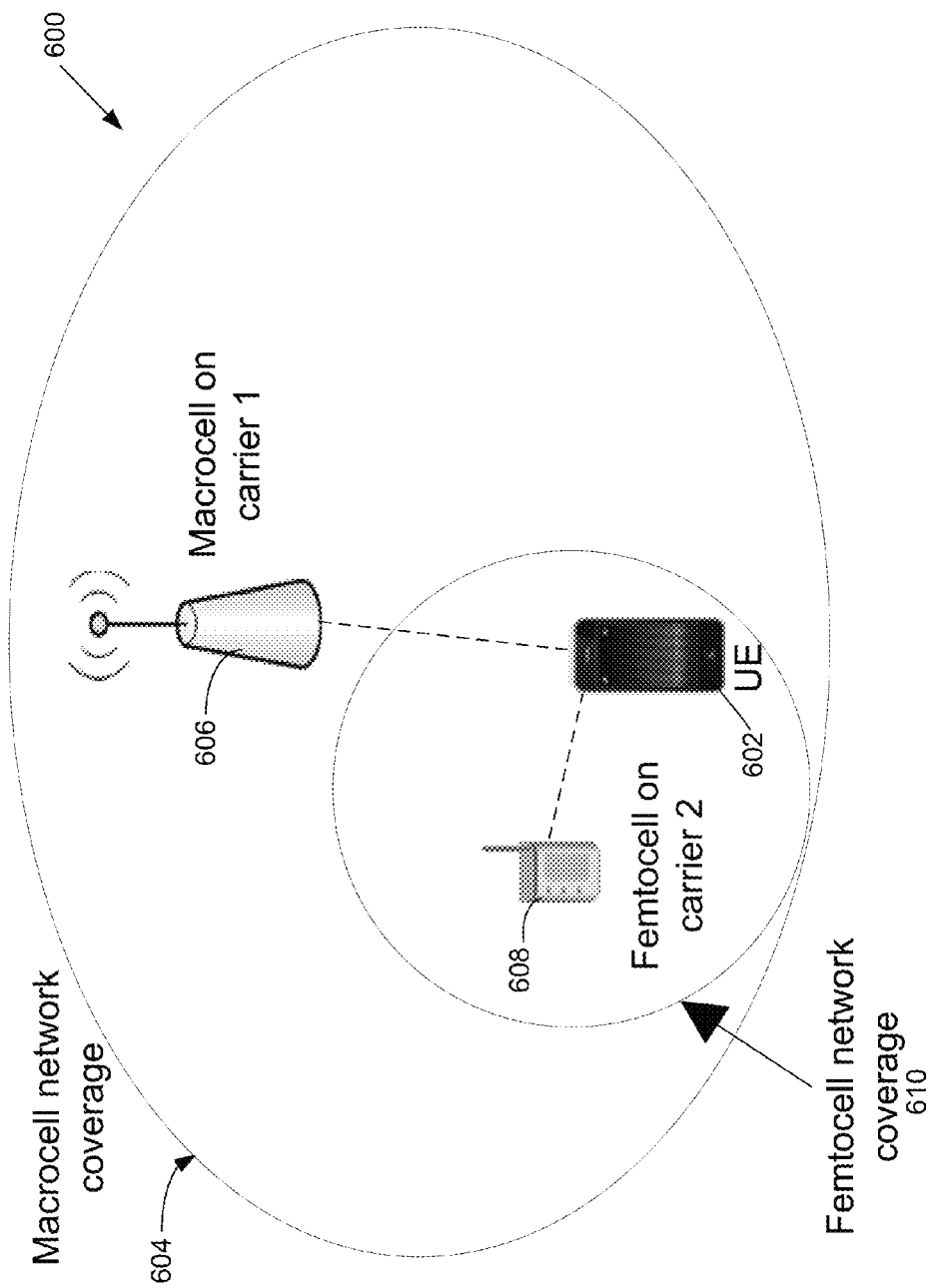
FIG. 6 is a schematic diagram illustrating aspects of carrier aggregation involving non-collocated cells, in which power headroom management as described herein may be applied.

FIG. 2 shows a down link frame structure 200 used in LTE, for example. The transmission timeline for the downlink may be partitioned into units of radio frames 202, 204, 206. Each radio frame may have a predetermined duration (e.g., 10 milliseconds (ms)) and may be partitioned into ten subframes 208 with indices of 0 through 9. Each subframe may include two slots 210. Each radio frame may thus include twenty slots with indices of 0 through 19. Each slot may include L symbol periods 212, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), or similar criteria.

Figure 3:
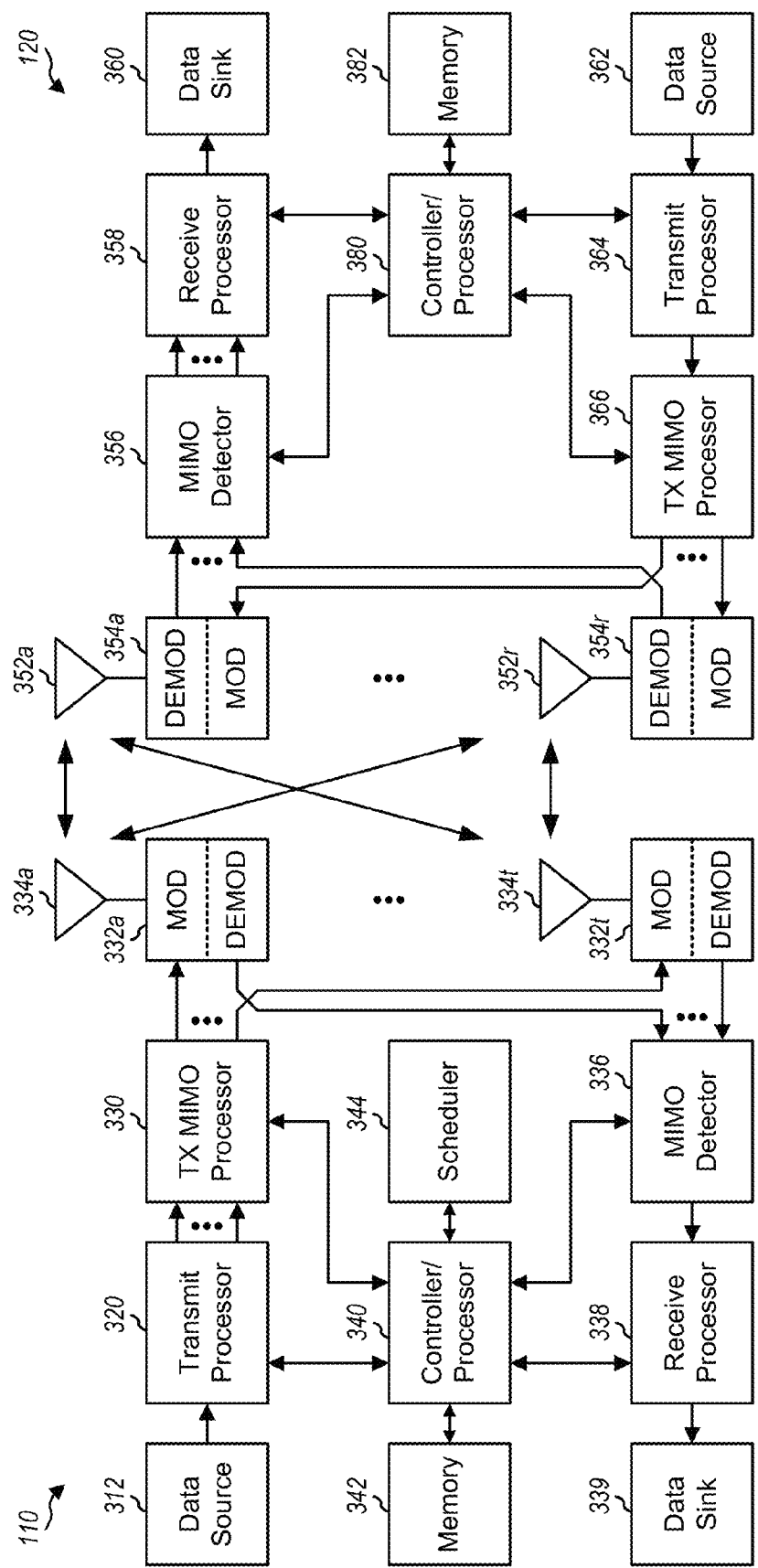
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For an LTE multiflow scenario, the base station 110 may be the macro eNB 110c in FIG. 1, and the UE 120 may be the UE 120y. The base station 110 may also be a base station of some other type such as an access point including a femtocell, a picocell, for example femto cell 110z. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other channel. The data may be for the PDSCH, or other channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM or other encoding method) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM or other modulation method) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the Primary Uplink Shared Channel (PUSCH)) from a data source 362 and control information (e.g., for the Primary Uplink Control Channel (PUCCH)) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM or other modulation method), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of the functional blocks illustrated in FIGS. 7-10B, and/or other processes for the techniques described herein. The processor 380 and/or other processors and modules at the UE 120 may also perform or direct the execution of the functional blocks illustrated in FIGS. 12-13, and/or other processes for the techniques described herein. The memories 342 and 382 may store data and program codes for the base station 110 and the UE 120, respectively. A scheduler 344 may schedule UEs for data transmission on the downlink and/or uplink.

By way of example of an advanced radio link feature in LTE, LTE-Advanced UEs can use spectrum in 20 Mhz bandwidths allocated to component carriers used in carrier aggregation, for up to a total of 100 Mhz (using 5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Figure 4:
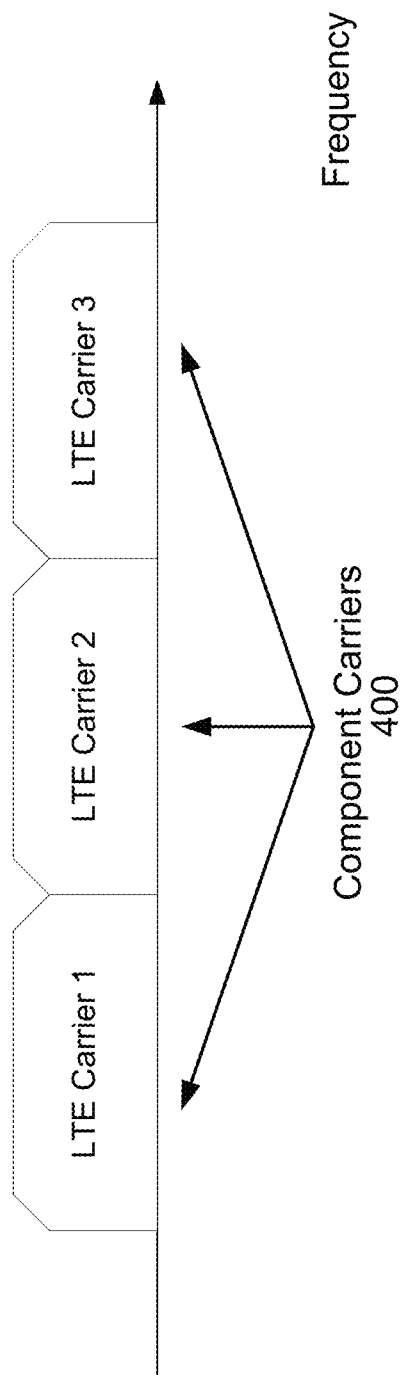
FIG. 4 is a block diagram illustrating an example of a continuous carrier aggregation type.
Figure 5:
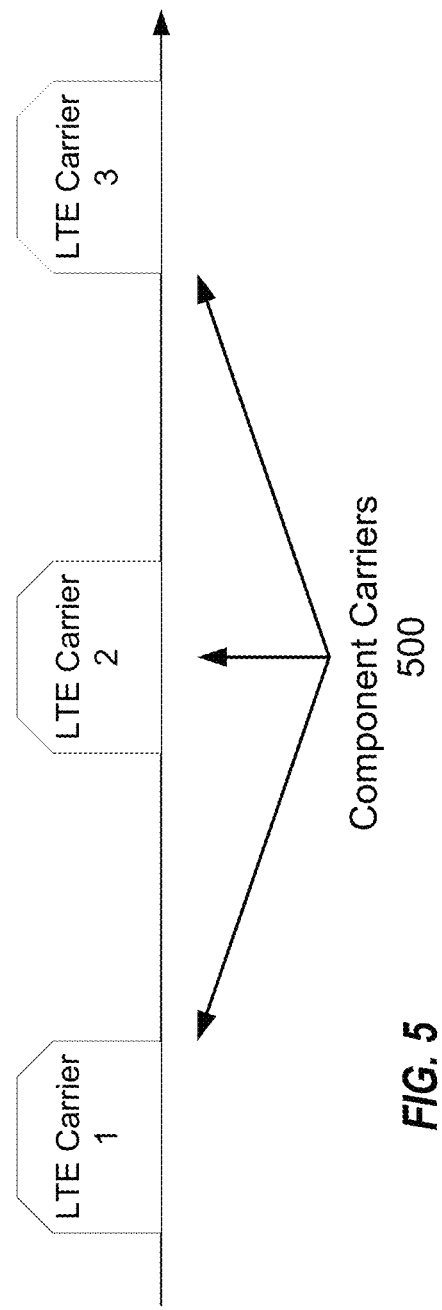
FIG. 5 is a block diagram illustrating an example of a non-continuous carrier aggregation type.

For the LTE-Advanced mobile systems, two types of carrier aggregation (CA) may be used, continuous CA and non-continuous CA. They are illustrated in FIGS. 4 and 5. Non-continuous CA occurs when multiple available component carriers 500 are separated along the frequency band, as illustrated by FIG. 5. On the other hand, continuous CA occurs when multiple available component carriers 400 are adjacent to each other, as illustrated by FIG. 4. Both non-continuous CA and continuous CA may be used to aggregate multiple LTE/component carriers to serve a single unit of LTE Advanced UE. Multiple radio frequency receiving units and multiple fast Fourier transforms (FFTs) may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary considerably at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different. Both continuous and non-continuous CA may require increased processing and power resources at the UE. Therefore, the UE may, when it detects a reason to restrict use of CA, limit the number of carriers used to some number less than the total number of available carriers. For example, the UE may request that the link be restricted to a single carrier. Such considerations may also apply when the UE is being served by non-collocated cells using different carriers.

Power Headroom Reporting and Management in LTE Multiflow

Multi-cell, e.g., dual cell, connectivity with non-collocated (independently controlled) cells operating on the same Radio Access Technology (RAT) is an area for enhancement in 3GPP Release 12. FIG. 6 shows a wireless system 600 in which a UE 602 is connected contemporaneously to different, independently controlled cells 606, 608. One of these cells 606, referred to as a primary cell, may have a first coverage area 604 and receive the PUSCH and PUCCH on a first carrier. Another of these cells 608, referred to as a secondary cell, may have a second coverage area 610 and receive the PUSCH (but not the PUCCH) on a second carrier. The UE 602 may be located in an area of overlap between the coverage areas 604, 610. Each cell 606, 608 may need to specify a minimum or optimal transmit power for the UE 602 to use, such that both cells can receive the uplink information. To do so, each of the cells may receive a power headroom (PH) report from the UE 602, and provide the UE with a requested or specified transmit power for the corresponding uplink component carrier that does not exceed the UE's power limit.

When the cells are co-located (controlled by the same serving eNB) the sheduler may ensure that the scheduled uplink transmissions do not exceed the transmit power limit of the UE, e.g., the power specified for all the uplink component carriers simultaneously being transmitted do not result in the UE exceeding the power limit. In the case where the cells 608, 606 are independently controlled, a problem of coordinating the transmit power specified by the different cells 606, 608 may arise. For example, without coordination the sum of the uplink transmit powers specified by the cells 606, 608 may exceed the power limit of the UE, even if each of the specified transmit power levels does not exceed the power limit.

In earlier LTE releases, for example LTE Release 10 or 11, carrier aggregation protocols were limited to supporting dual cell connectivity only in the case of collocated (commonly controlled) cells. In such earlier dual collocated cell connectivity, scheduling could be achieved across carriers using joint Media Access Control (MAC) mechanisms.

Enhancement of multi-cell connectivity for non-collocated cells may require modifying various aspects of prior approaches for multi-cell connectivity using collocated cells. For example, implementation of the PUCCH on the primary and secondary cells, backward compatibility for older UEs, handling of Buffer Status Reports (BSRs) and timing may all require adjustment of the techniques used in carrier aggregation with collocated cells, or the development of new techniques for PH management. Additional modifications to existing solutions for PH management or new solutions for PH management may be required or desirable to improve power headroom management for uplink carrier aggregation with non-collocated cells. Different techniques for PH management are described in more detail below, including algorithms for PH management by at least one processor of one or more cells in communication with at least one mobile entity.

UEs may be subject to defined power limits based on considerations such as user safety, hardware limitations, and prevention of excess interference. Power headroom refers to a difference between a defined total transmit power limit for the UE ($P_{CMAX}$) and the aggregate transmitting power being used by the UE at a current time. The power headroom indicates by how much the UE can increase its transmission power without exceeding its total power limit, at any given time.

In LTE Release 10/11 implementations power headroom may be classified into two different types. The first type of PH may reflect the power headroom assuming PUSCH only transmission on the carrier and may be determined by the difference between $P_{CMAX}$ and current transmit power on the PUSCH. The second type of PH may reflect the power headroom assuming combined PUSCH and PUCCH transmission on the carrier and may be determined by the difference between $P_{CMAX}$ and current transmit power on the PUSCH and PUCCH.

In carrier aggregation with collocated cells, PH may be determined and reported on a per component carrier basis in an enhanced PH Report (ePHR) for the different PH types, as follows. For the first type, PH per component carrier may be determined by the difference between a maximum transmit power allocated to the component carrier ($P_{CMAX,C}$), where c is the index identifying the cell/component carrier, and PUSCH power for the same component carrier ($P_{PUSCH,C}$). Note that the transmit power for the PUSCH may be determined by a power control algorithm (before power scaling but including the per carrier limitation $P_{CMAX,C}$. For the second type, PH for the primary component carrier may be determined by the difference between the maximum transmit power allocated to the primary component carrier ($P_{CMAX,C}$) and the sum of the PUSCH and PUCCH powers for the same primary component carrier ($P_{PUSCH,C}$ and $P_{PUCH,C}$). The ePHR may include the PH per component carrier and $P_{CMAX,C}$ for each component carrier, and may not include an overall total power output of the UE, $P_{CMAX}$. The total power output $P_{CMAX}$ may not be reported in the collocated case. Because the component carriers, in the collocated case, are commonly controlled, each cell of the corresponding component carrier can keep track of how much transmit power is being allocated to the other cell. Thus, the ePHR includes sufficient information for control of the PH in the collocated case.

In contrast, different approaches may be advantageous for use in CA by non-collocated cells. For intra-band contiguous CA, the uplink PH may be reported assuming power is increased evenly across cells/component carriers until $P_{CMAX}$ (or a lower limit) is reached. For inter-band CA, power may be increased independently across cells/component carriers. In this case, a lack of scheduling coordination between cells may impact performance under power limiting conditions.

A PH report (PHR) provided by the UE to serving cells may be triggered in the collocated case based on certain RRC parameters for triggering PH reporting, for example periodicPHR-Timer, prohibitPHR-Timer, and dl-PathLoss-Change parameters. The purpose of these parameters is explained below. Periodic PH reporting may be triggered by expiration of the periodicPHR-Timer, which may be reset after each report. Event-based reporting may be triggered by, for example, configuration or reconfiguration of PH reporting functionality, or by activation of the secondary cell for uplink CA. Combined periodic and event-based triggering may include, for example, generating a trigger upon expiration of the prohibitPHR-Timer when the UE has new uplink transmission resources and at least one of the following occurs: a path loss measurement changes more than dl-PathLossChange since the last PHR; or the required power backoff Peak Maximum Power Reduction (PMPRc) for a cell c changes more than dl-PathLossChange and the UE has either a PUSCH or PUCCH transmission on cell c in the Transmission Time Interval (TTI) to which the PHR relates. The variable dl-PathLossChange may have any one of various values; for example, one of +1 dB, +3 dB, +6 dB, or to an enumerated value designated for disabling PH reporting.

With respect to power headroom reporting for multi-cell connectivity to non-collocated serving cells, different scenarios may be applicable. In an intra-band contiguous CA scenario using a single power amplifier (PA) for uplink, independent power control can cause significant variation of transmission Power Spectral Density (transmissionPSD) and power across cells. In the intra-band case, PA design may be challenging in terms of power efficiency and operating point for uplink transmission, because the operating point will vary dramatically depending on how many carriers are in use, and because the PA may be less easily optimized for a typical operating range. PH reporting may be addressed in a similar way as in LTE Release 10. For example, the UE may assume uplink transmission power will be increased equally on all component carriers when reporting PHc and $P_{CMAX,C}$ (which by definition are per component carrier) and therefore report equal values to the corresponding cells of the component carriers.

For an inter-band CA, single-RAT scenario, which uses multiple PAs (one for each band), the intra-band approach may not be desirable or workable. Inter-band CA may be the most practical scenario for multiflow, and unlike intra-band CA may not implicate difficult PA design issues. However, existing PH reporting methods and protocols, which specify independent reporting per cell, may be insufficient for the inter-band scenario.

Multiflow cannot rely on coordinated scheduling to avoid exceeding UE power limitations. Without multiflow coordination, a challenge may be how to retain scheduling flexibility across uplink component carriers, while avoiding UE power limiting conditions. For example, consider a UE that has two PAs. Each PA may have have $P_{CMAX,1}=P_{CMAX,2}=23$ dBm. For this UE, the overall PCMAX may also be equal to 23 dBm. In a collocated case, the serving eNB can ensure via scheduling (e.g., prioritization, Time Division Multiplexing (TDM)) that the overall total transmission power output of the UE is less than the UE's overall transmit power limit (e.g., <23 dBm).

For non-collocated multi-cell, e.g., dual cell, connectivity, independent scheduling of the component carriers by the different cells may cause problems for UE uplink power control. For example if each cell c schedules the power for the uplink physical channels of the corresponding component carrier based only on $P_{CMAX,C}$, overall UE transmission power may sometimes be greater 23 dBm when more than one of the uplink component carriers are scheduled in the same TTI. Conversely, if the UE caps $P_{CMAX,C}$ at less than the overall UE output power limit, UL performance may be degraded for the cells. Each cell backing off uplink power based on the other cells' PHR may lead to suboptimal performance because a UE typically is not scheduled to transmit on multiple uplink carriers all the time, so backing off may be unnecessary at times.

The foregoing problems may arise from competing considerations, such that one problem related to uplink power control generally cannot be fully solved without adversely impacting another problem associated with uplink power control. Potential approaches for addressing uplink power control issues for independently controlled uplink component carriers may include, for example, implementing weak (e.g., static or semi static) cell coordination with no changes in UE reporting methodologies; or changing UE reporting methodologies and forgoing reliance on inter-cell coordination to resolve PH management problems.

Various high level methods for handling multiflow PH reporting may be possible, and are summarized below. These methods may be independently applied; selected methods may sometimes be excluded. One method may include implementing a new trigger for PH reporting. The new PH reporting trigger may be used to inform other cells participating in an uplink CA connection when a cell changes uplink (increases or decreases) power usage significantly, e.g., substantially enough to impact PH reporting and management or cause a threshold to be exceeded.

Another method may include implementing a new PHR. The new PHR for a first cell participating in a multiflow connection may include power usage by other cells participating in the multiflow connection. Using the new PHR, the UE may keep all participating cells informed of the aggregate PH for the multiflow connection.

Another method may include loose cell coordination. Loose cell coordination means distributed coordination of transmission power to minimize power limitations and provide better performance. Loose cell coordination may be considered weak in that the coordination excludes scheduling coordination between the cells.

Another method may include power prioritization by the UE when the UE limits its overall transmit power. When the UE detects that it is in a power-limited situation (e.g., battery power low, UE maximum transmit power will be exceeded, or other power-limiting condition), conflicting power requirements from different cells may be prioritized by the UE such that less than all requested power is allocated to one or more uplink component carriers.

More detailed aspects for resolving problems with multiflow PH reporting for inter-band carrier aggregation may include, for example, overriding the secondary cell maximum power value for multiflow UEs. Maximum power may be a parameter configured by the cell to cap the maximum transmission power of the UE. The primary cell may set or specify the secondary cell maximum power value for multiflow UEs to a small fraction of the primary cell maximum power. This may be accomplished, for example, by the primary cell signaling the maximum power override over a backhaul to the secondary cell. This approach may be referred to as explicit coordination between participating multiflow cells.

Advantages of explicit coordination may include, for example, reducing the probability that the UE will exceed its specified power limitation, minimizing changes to existing LTE standards and reducing overhead. With explicit coordination limited coordination is required among cells and may be limited to specifying a maximum power override value for secondary cells. Furthermore, this approach does not require implementing a new PH reporting triggering methodology. Disadvantages may include, for example, adversely impacting performance of the secondary cells if the new maximum power is set too low. This may limit the gains of multiflow for UL carrier aggregation. Disadvantages may further include limiting the peak UL throughput on the secondary cells in scenarios that are not power limited. Also, the approach may adversely impact the link budget of the PUCCH, because the maximum power override may not be rate-controlled. That is, the maximum power override may sometimes be lower than necessary due to fluctuations in uplink traffic rates. In the illustrative examples described below, each cell is assumed to operate on a corresponding component carrier. Accordingly, "cell" may sometimes be used interchangeably with "component carrier."

In a second alternative approach, implicit coordination between participating multiflow cells may resemble PH reporting in earlier LTE releases. Each cell may use a $P_{CMAX,C}$ (total transmit power limit for the UE, per cell where c is an index indicating the cell) and PH (current power headroom, per cell) reported by the UE to determine the total power used and identify when to apply a power limitation on one or both cells. For example, a coordination procedure may include an algorithm as summarized in the paragraph below.

In response to receiving a PHR, each participating cell may, if $\Sigma_c(P_{CMAX,c}\text{-PH}_c)_{linear} > \text{Th\_lin}$, reduce its maximum power by Xc dB, wherein Th_lin is a known threshold e.g, 200 mW (23 dBm), c is an index indicating the cell, and Xc is a certain power increment. Then, each participating cell derives a new $P'_{CMAX,C} = P_{CMAX,C} - Xc$ to be used for power control (instead of $P_{CMAX,C}$) until the next PHR. Xc may be set to equal an accumulated fixed step size 'δ'; or may be determined by a one-time function of $P_{CMAX,C}$, $PH_C$ and Th_lin. Alternatively, if $\Sigma_c(P_{CMAX,C}\text{-PH}_C)_{linear} \leq \text{Th\_lin}$, each participating cell $_C$ may set $P'_{CMAX,c} = P_{CMAX,C}$, if applying a one-time correction for Xc, or may set $P'_{CMAX,C} = P_{CMAX,C} + \delta$ if applying accumulated corrections. The step size δ in dB may be configured via Operations and Management (OAM) for each cell, or exchanged over the backhaul between the cells. For example, a step size in the range of about 0.5 to 5 dB may be configured; for further example, a step size of 1 dB or 3 db may be configured.

The forgoing approach uses implicit coordination between participating cells based on the PHR and reduces additional signaling between cells needed for explicit coordination. The UE coordinates the participating cells by selecting appropriate values of $P_{CMAX,C}$ and $PH_C$ in the PHR. Advantages of implicit coordination may include, for example, more accurate control over when to trigger a power reduction. If the triggering condition is not met, each participating cell can schedule at maximum required power. Disadvantages may include, for example, relying on implicit coordination among participating cells. When the participating cells are not standardized (e.g., are not employing the same coordination approach), implicit coordination may fail without the failure being detected by the participating cells.

In a third alternative approach, implicit coordination may be combined with a new PHR. This may be similar to the second approach described above, with the addition of the UE reporting its own overall $P_{CMAX}$ value. Therefore, the PHR may better reflect the overall power condition of the UE. In general, overall $P_{CMAX}$ cannot be directly derived from $P_{CMAX,C}$ because the values may be derived from independent constraints. The reported $P_{CMAX}$ in the new PHR may be used instead of Th_lin to derive Xc. Advantages of this approach may include, for example, the PHR more accurately describing the UE's power constraints during scheduling. Disadvantages may include, for example, requiring a change in the PHR, e.g., reporting $P_{CMAX}$ in the PHR, with a corresponding change in the applicable wireless standard.

In a fourth alternative approach, UE-assisted PH reporting may be implemented without coordination between participating multiflow cells. For example, a new quantity may be defined at the UE, symbolized here by "PMPRc_r12." The PMPRc_r12 represents a measure of peak maximum power reduction (PMPR) that incorporates the secondary cell power into the PMPRc for the primary cell. Conversely, the PMPRc_r12 for the secondary cell incorporates the primary cell power. In general:

$$\text{PMPR}c\_r12 = \text{PMPR}c + \text{PMPR}'c;$$

wherein PMPR'c is the peak maximum power reduction requirement determined at the UE for the other (e.g., secondary) cell. This approach may be generalized to more than two cells.

The UE may report the PMPRc_r12 in the PHR using existing protocols for reporting the inter-RAT PMPR. The participating cells then may interpret the PMPRc_r12 as a value for controlling intra-RAT multiflow based on the relationship "PMPRc_r12=PMPRc+PMPR'c." Each cell receives contained in the PMPRc_r12 information about the power requirement for the other cell or cells. Changes to present wireless standards may thereby be avoided. Currently, PMPRc is a UE implementation dependent scaling factor to account for inter-RAT power management. The fourth alternative extends use of PMPR to LTE/LTE multiflow scenarios when PMPR is not needed for inter-RAT power management.

Triggering the PHR with a PMPRc_r12 may be based on a transmission power change. For example, if a cell increases or decreases its transmission power by at least dl-PathLossChange, a new PHR may be triggered to inform the other cell(s) of the change, wherein dl-PathLossChange may be a value selected from +1 dB, +3 dB, +6 dB, or an enumerated value designated for disabling PH reporting. In an alternative, a new RRC parameter, for example CelltransmissionPowerChange, may be defined as a threshold, with any desirable value, for example, between about +1 dB and +6 dB, as well as a value designated for disabling PH reporting. The measured increase in PMPR'c should be sufficiently filtered over time, for example by at least 10 s of ms.

Advantages of the fourth alternative may include, for example, minimizing changes to existing wireless standards and facilitating extending PMPR to include other LTE (intra-RAT) cells. Advantages may further include providing the UE with more flexibility in power allocation and obviating the need for coordination among participating multiflow cells.

Uplink power control for certain physical channels, e.g., PUCCH, may include some additional considerations. If a power limitation is incurred on a PUCCH transmission, power reduction may not be desirable. For example, back off on the PUCCH may cause loss of ACK/NAK signaling. Accordingly, power control on multiple physical channels to be transmitted in parallel may be prioritized to enable less power back off on channels carrying control information or other high priority content. Control signals (e.g., PUCCH) of one cell may be assigned a higher priority over data for another cell. For further example, ACK/NAK signaling of one cell may be assigned higher priority over CQI signals of another cell. In the alternative, or in addition, power prioritization may be based on cell type. For example, primary cell control may be assigned a higher priority than secondary cell control. With respect to the PUSCH, certain PUSCH transmissions occurring regularly could also be prioritized or other PUSCH transmissions. For example, semi-persistent scheduling (SPS) based voice over Internet Protocol (VoIP) signaling, or uplink control information (UCI) on the PUSCH may be given priority over other data being handled by a different cell in a multiflow scenario.

In accordance with one or more embodiments of the present disclosure, there are provided techniques for uplink power headroom management for connectivity with logically separate dual cells of a wireless communications system. The methods are described in more detail below.

Figure 7:
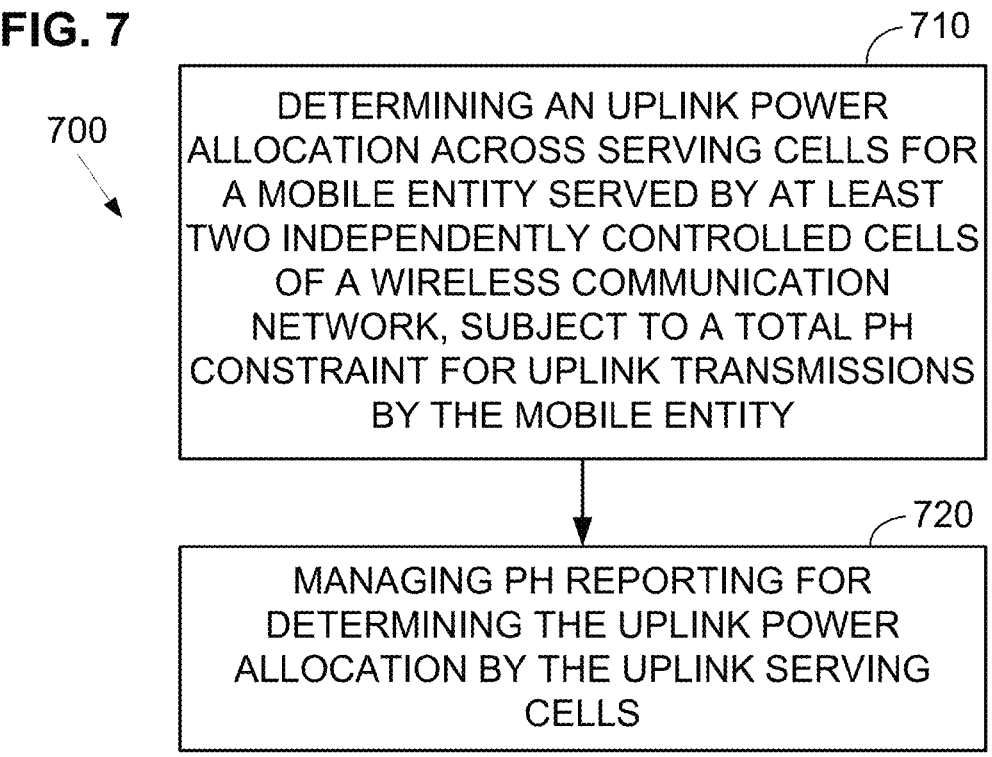
FIG. 7 illustrates an exemplary methodology for power headroom management performed by one or more independently controlled cells serving a mobile entity using uplink carrier aggregation.

With reference to FIG. 7, a methodology 700 for power headroom management in uplink carrier aggregation with independently controlled cells operating on the same RAT may be performed by a network entity or entities, such as, for example, a femocell, a macrocell, a picocell, or other small cell. The method 700 may involve, at 710, determining an uplink power allocation across at least two independently controlled cells of a wireless communication network for a mobile entity served by at least two independently controlled cells of a wireless communication network, subject to a total PH constraint for uplink transmissions by the mobile entity. One, or more, of the at least two cells may determine the uplink power allocation. Determining the allocation may include generating information for controlling allocation of uplink power among separate transmitters of a mobile entity using separate carriers in a carrier aggregation mode to communicate with all of the at least two independently controlled cells.

The method 700 may further include, at 720, managing PH reporting for the uplink serving cells. Managing the PH reporting may include, for example, at least one of: explicit coordination between the at least two independently controlled cells, implicit coordination between the at least two independently controlled cells, or configuring PH reporting from the mobile entity by at least one of the at least two independently controlled cells. Configuring PH reporting from the mobile entity may include signaling (explicitly or implicitly) from the eNB that informs the mobile entity concerning the type of PHR to provide to the independently controlled cells. Any suitable protocol may be used to provide the information to the mobile entity.

In an aspect, managing the PH reporting may include embodiments that do not involve or require receiving a PHR from the mobile entity. In such cases, managing the PH reporting may be performed by explicit or implicit signaling between the independently controlled cells for coordinating the PH allocated to each cell, sometimes referred to herein as "explicit coordination" and "implicit coordination," respectively. These and other aspects of the method 700 are described in more detail below.

FIGS. 8-10B show further optional operations or aspects 800, 900, 1000 or 1050 that may be performed by the independently controlled cell or cells in conjunction with the method 700. The operations shown in FIGS. 8-10B are not required to perform the method 700. The optional operations 800, 900 1000 or 1050 are independently performed and not mutually exclusive. Therefore any one of such operations may be performed regardless of whether another downstream or upstream operation is performed. If the method 700 includes at least one operation of FIGS. 8-10B, then the method 700 may terminate after the at least one operation, without necessarily having to include any subsequent downstream operation(s) that may be illustrated.

Figure 8:
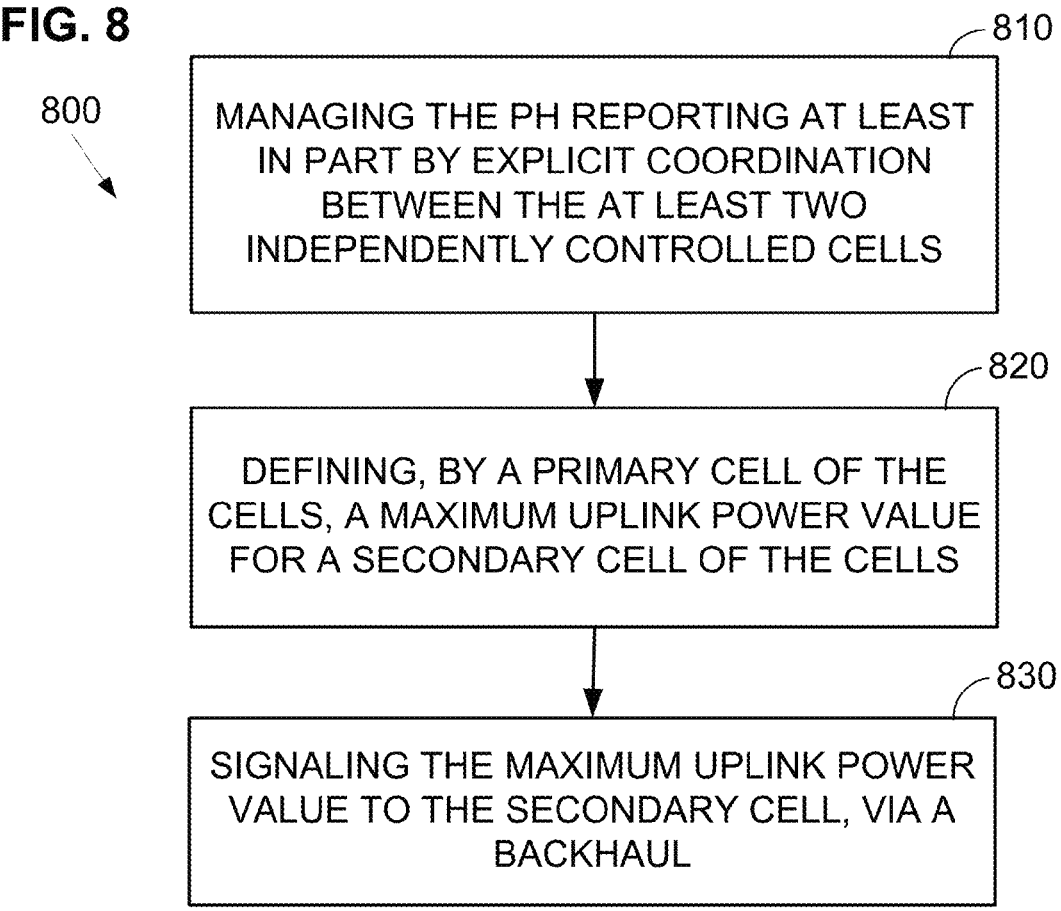

The method 700 may include, for example, one or more of the additional operations 800 shown in FIG. 8. The method 700 may include, at 810, managing the PH reporting at least in part by explicit coordination between the at least two independently controlled cells. In such case, the method 700 may further include, at 820, defining, by a primary cell of the at least two independently controlled cells, a maximum uplink power value for a secondary cell of the cells. One of the cells may be a primary cell (e.g., a macrocell) while the other may be a secondary cell (e.g., a small cell). As used above, the primary cell is the cell that determines the maximum uplink power for the other cell(s), regardless of cell size or power. The method 700 may further include, at 830, signaling the maximum uplink power value to the secondary cells, via a backhaul. The maximum uplink power value may override the secondary cell maximum power value for multiflow UEs. Optionally, unequal maximum uplink power values may be provided to different secondary cells, if more than one secondary cell is involved in the method 700. Maximum power may be a parameter configured by the cell to cap the maximum transmission power of the UE. The primary cell may set or specify the secondary cell maximum power value for multiflow UEs to a small fraction of the primary cell maximum power.

In alternative embodiments, the method 700 may include, for example, one or more of the additional operations 900 shown in FIG. 9. The method 700 may include, at 910, managing the PH reporting at least in part by implicit coordination between the at least two independently controlled cells. In such case, the method 700 may include, at 920, each of the at least two independently controlled cells determining a partial power headroom (PH) per cell based on a PHR that each of the cells receives from the mobile entity. Each cell may use an assumed or implied value (e.g., see discussion of Th_lin above) for the maximum transmission power aggregated for all antennas of the mobile entity (see discussion of $P_{CMAX}$ above). The method 700 may further include, at 930, receiving the PHR containing information comprising a maximum transmission power aggregated for all antennas of the mobile entity, and a PH per cell. A multiflow cell may receive the maximum transmission power aggregated for all antennas of the mobile entity in a transmission from the mobile entity, for example in a modified PHR (e.g., modified compared to current PHR specifications). In addition, the method 700 may include, at 940, determining a mobile entity transmission power based on the PHR and on a defined linear (or other definite) power threshold for each of the at least two independently controlled cells. In the alternative, or in addition, the method 700 may further include, at 950, each cell determining a mobile entity transmission power based on the PHR and on the maximum transmission power aggregated for all antennas of the mobile entity, for each of the at least two independently controlled cells.

In further alternative embodiments, the method 700 may include, for example, one or more of the additional operations 1000 shown in FIG. 10A. The method 700 may include, at 1010, managing the PH reporting at least in part by each of the at least two independently controlled cells receiving the PH control information from the mobile entity. The method may include, at 1020, modifying the PH control information based on a Peak Maximum Power Reduction (PMPR). The method 700 may further include, at 1030, each of the at least two independently controlled cells determining a mobile entity transmission power based on the PH control information. More detailed examples of algorithms for managing the PH reporting at block 1010, modifying the PH control information at block 1020, and determining a transmission power at block 1030 are described above in conjunction with the fourth alternative approach herein above.

In further alternative embodiments, the method 700 may include, for example, one or more of the additional operations 1050 shown in FIG. 10B. The method 700 may include, at 1060, prioritizing one of one or more transmission types by at least one of allocating power by transmission type or excepting a transmission type from a per-cell PH constraint. For example, a portion of the PH may be reserved for higher priority communications, which reservation may ensure a desired minimum power for a prioritized channel, data, or cell. In the alternative, or in addition, power limits imposed by a PH limit may be ignored if necessary to provide a desired minimum power level to a prioritized channel, data, or cell. The method 700 may further include, at 1070, basing the prioritizing on one or more of channel type, content type, or cell type. For example, a higher priority for power allocation may be assigned to a control channel, for example the PUCCH, to voice data, or to a primary cell.

Figure 11:
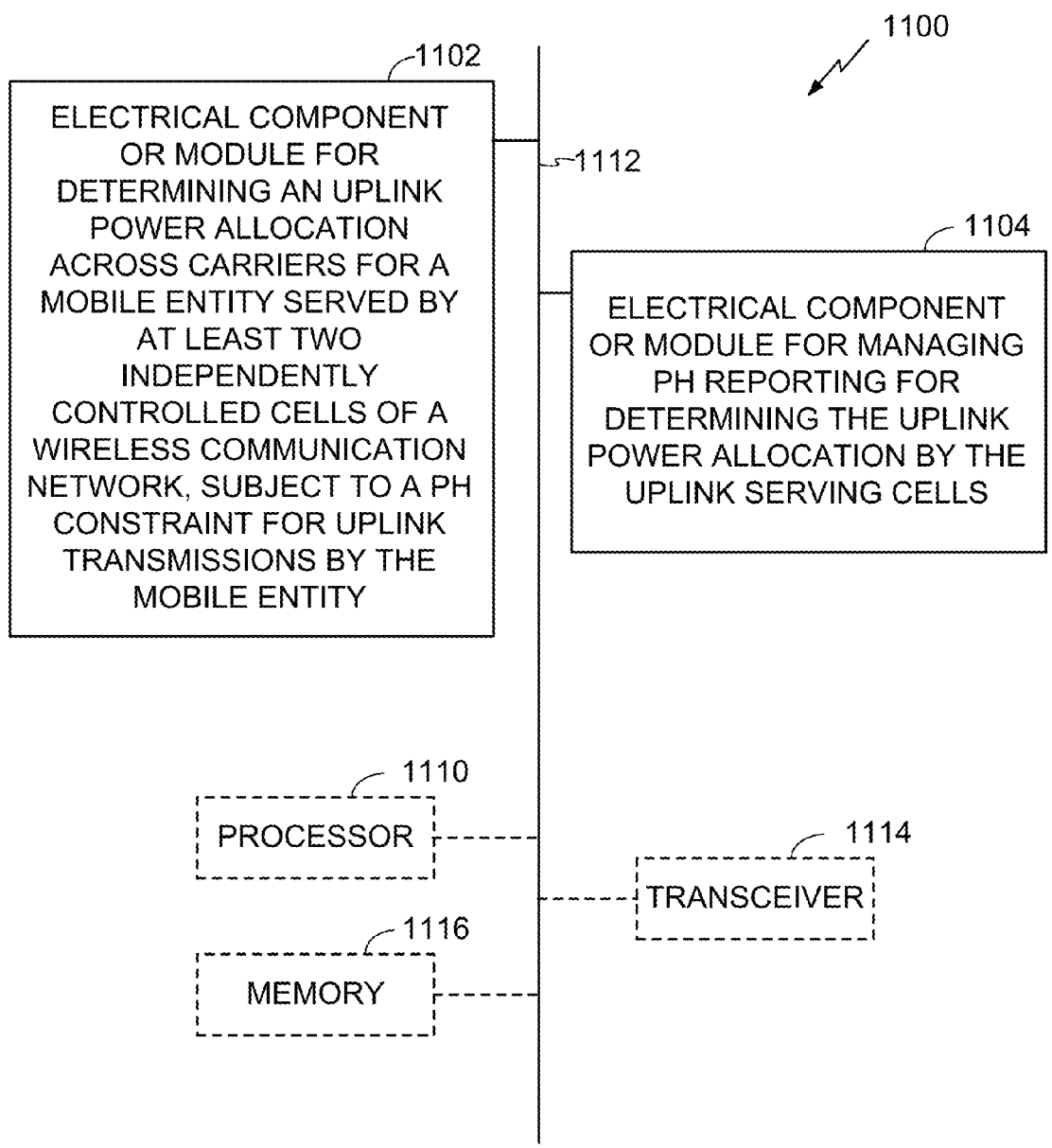
FIG. 11 shows an embodiment of an apparatus for uplink power headroom management, in accordance with the methodology of FIGS. 7-10B.

FIG. 11 shows an embodiment of an apparatus 1100 for managing PH for a multiflow connection (e.g., power headroom management in uplink carrier aggregation with independently controlled cells operating on the same RAT), in accordance with the methodology of FIGS. 7-10B. The exemplary apparatus 1100 may be configured as a network entity (e.g., a femocell, a macrocell, a picocell, or other cell) in a wireless network, or as a processor or similar device/component for use within the network entity. The apparatus 1100 may include functional blocks that can represent functions implemented by a processor, software, hardware, firmware or combination thereof.

For example, apparatus 1100 may include an electrical component or module 1102 for determining an uplink power allocation across at least two independently controlled cells of a wireless communication network for a mobile entity served by at least two independently controlled cells of a wireless communication network, subject to a total PH constraint for uplink transmissions by the mobile entity. The component 1102 may comprise a means for determining the uplink power allocation across at least two independently controlled cells of a wireless communication network for a mobile entity, subject to the PH constraint, served by the at least two independently controlled cells. Said means may include, for example, a processor in a network entity or the like performing a more detailed algorithm. The more detailed algorithm may include, for example, determining the PH constraint using any of the more detailed operations described in connection with the initial blocks 810, 910 and 1010 of FIGS. 8-10B, and determining an uplink power allocation subject to the PH constrain using operations as described in connection with the corresponding blocks of the FIGS. 8-10B following the initial blocks.

The apparatus 1100 may further include an electrical component or module 1104 for managing PH reporting for determining the uplink power allocation by each of the at least two independently controlled cells. The component 1104 may comprise a means for managing the PH reporting. Said means may include, for example, a processor in a network entity or the like performing a more detailed algorithm. The more detailed algorithm may include, for example, communicating the uplink power allocation to the mobile entity, for example using a control channel transmitted from one or both of the two cells, or the algorithms described above for explicit coordination and implicit coordination.

In related aspects, the apparatus 1100 may optionally include a processor component 1110 having at least one processor, in the case of the apparatus 1100 configured as a network entity (e.g., an eNB, a femocell, a macrocell, a picocell, or the like), rather than as a processor. The processor 1110, in such case, may be in operative communication with the components 1102-1104 via a bus 1112 or similar communication coupling. The processor 1110 may effect initiation and scheduling of the processes or functions performed by electrical components 1102-1104.

In further related aspects, the apparatus 1100 may include a radio transceiver component 1114, which may be coupled to other transmission components (not shown) for example one or more power amplifiers and antennas or antenna arrays. A stand alone receiver and/or stand alone transmitter may be used in lieu of or in conjunction with the transceiver 1114. When the apparatus 1100 is a network entity, the apparatus 1100 may also include a network interface (not shown) for connecting to one or more core network entities. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1104, and subcomponents thereof, or the processor 1110, or the methods disclosed herein. The memory component 1116 may retain instructions for executing functions associated with the components 1102-1104. While shown as being external to the memory 1116, it is to be understood that the components 1102-1104 can exist within the memory 1116. It is further noted that the components in FIG. 11 may comprise processors, electronic devices, hardware devices, electronic sub-components, logical circuits, memories, software codes, firmware codes, associated components, or any combination thereof.

In other aspects, a mobile entity (e.g., a UE) of a wireless communication network may perform a method 1200 for PH management in uplink carrier aggregation, as shown in FIG. 12. The method 1200 may include, at 1210, a mobile entity subject to a PH limitation signaling data using uplink carrier aggregation to at least two independently controlled cells of a wireless communication network. The method 1200 may further include, at 1220, the mobile entity providing information for managing uplink power control from the mobile entity to each of the at least two independently controlled cells. Examples of different algorithms for managing uplink power control have been described above, and are summarized in connection with FIGS. 8-10B above.

FIG. 13 shows further optional operations or aspects 1300 that may be performed by mobile entity in conjunction with the method 1200. The operations shown in FIG. 13 are not required to perform the method 1200. The optional operations 1300 are independently performed and not mutually exclusive. Therefore any one of such operations may be performed regardless of whether another downstream or upstream operation is performed. If the method 1200 includes at least one operation of FIG. 13, then the method 1200 may terminate after the at least one operation, without necessarily having to include any subsequent downstream operation(s) that may be illustrated.

Referring to FIG. 1300, the method 1200 may further include, at 1310, providing the information comprising a maximum transmission power of the UE allocated to each cell and a PH per cell. The method 1200 may further include, at 1320, providing the information comprising a maximum transmission power aggregated for all antennas of the mobile entity. The method 1200 may further include, at 1330, providing the information comprising a PH report modified by a Peak Maximum Power Reduction (PMPR) applied at the UE for uplink transmission to each of the at least two independently controlled cells. The PMPR may be, for example, a "PMPRc_r12" as described in more detail herein above. Accordingly, for example, the method 1200 may further include, at 1340, the mobile entity computing the PMPR based on a transmission power of at least one of the at least two independently controlled cells. For example, in multiflow carrier aggregation, the transmission power of a primary cell may be a factor in determining a PMPR to be applied for uplink transmissions to a secondary cell, while the transmission power of a secondary cell may be a factor in determining a PMPR to be applied for uplink transmissions to a primary cell.

Figure 14:
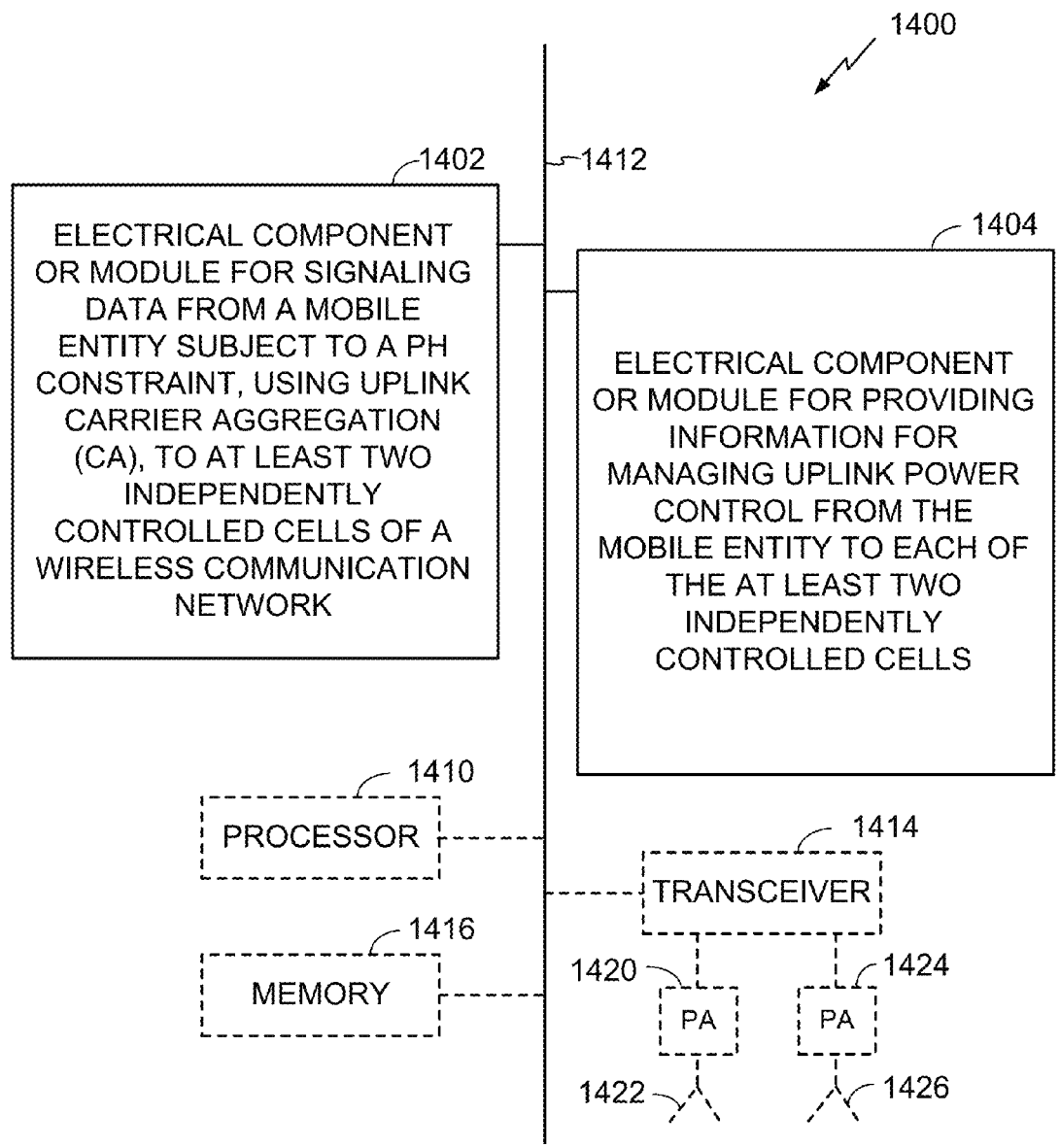
FIG. 14 shows an embodiment of an apparatus supporting power headroom management in uplink carrier aggregation with independently controlled cells, in accordance with the methodology of FIG. 12.

FIG. 14 shows an embodiment of an apparatus 1400 for Power Headroom management by a mobile entity configured for carrier aggregation with different independently controlled cells, in accordance with the methodology of FIGS. 12-13. The exemplary apparatus 1400 may be configured as a mobile entity (e.g., a UE, a mobile station, a terminal, an access terminal, a subscriber unit, a station, or the like) in a wireless network, or as a processor or similar device/component for use within the mobile entity. The apparatus 1400 may include functional blocks that can represent functions implemented by a processor, software, or combination thereof (e.g., firmware). For example, apparatus 1400 may include an electrical component or module 1402 for signaling data from a mobile entity using uplink carrier aggregation to at least two independently controlled cells of a wireless communication network, subject to a PH constraint. The component 1402 may comprise a means for signaling data from a mobile entity subject to a PH constraint using uplink carrier aggregation to at least two independently controlled cells of a wireless communication network. Said means may include, for example, a processor in a mobile entity or the like performing a more detailed algorithm. The more detailed algorithm may include, for example, processing an uplink transmission for carrier aggregation, determining a power headroom for the uplink transmission based on information from the two or more cells, and/or based on information determined at the mobile entity, and controlling an uplink power of two or more transmitters of the apparatus 1400 in compliance with the power headroom. Further details of suitable algorithms are discussed above, for example, in connection with FIG. 12.

The apparatus 1400 may further include an electrical component or module 1404 for providing information for managing uplink power control from the mobile entity to each of the at least two independently controlled cells. The component 1404 may comprise a means for providing information for managing uplink power control from the mobile entity to each of the at least two independently controlled cells. Said means may include, for example, a processor in a mobile entity or the like performing a more detailed algorithm. The more detailed algorithm may include, for example, detecting a PH reporting triggering event, generating a PHR based on information in the memory 1416 for example information as described in connection with FIG. 13, and transmitting the PHR to each of the independently controlled cells using a broadcast transmission, or separate unicast transmissions.

In related aspects, the apparatus 1400 may optionally include a processor component 1410 having at least one processor, in the case of the apparatus 1400 configured as a mobile entity (e.g., a UE, a mobile station, a terminal, an access terminal, a subscriber unit, a station, or the like), rather than as a processor. The processor 1410, in such case, may be in operative communication with the components 1402-1404 via a bus 1412 or similar communication coupling. The processor 1410 may effect initiation and scheduling of the processes or functions performed by electrical components 1402-1404.

In further related aspects, the apparatus 1400 may include a radio transceiver component 1414, which may include multiple antennas or antenna arrays (such as, for example dual antenna arrays) 1422, 1426 and separate power amplifiers 1420, 1424 for each of the multiple antennas or arrays, subject to the PH limitation. A stand alone receiver and/or stand alone transmitter may be used in lieu of or in conjunction with the transceiver 1414. When the apparatus 1400 is a network entity, the apparatus 1400 may also include a network interface (not shown) for connecting to one or more core network entities. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for effecting the processes and behavior of the components 1402-1404, and subcomponents thereof, or the processor 1410, or the methods disclosed herein. The memory component 1416 may retain instructions for executing functions associated with the components 1402-1404. While shown as being external to the memory 1416, it is to be understood that the components 1402-1404 can exist within the memory 1416. It is further noted that the components in FIG. 14 may comprise processors, electronic devices, hardware devices, electronic sub-components, logical circuits, memories, software codes, firmware codes, associated components, or any combination thereof. The apparatus 1400 may, in an aspect, include two or more independently controlled cells of a wireless communication network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes storage media. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray™ disc wherein disks usually hold magnetically encoded data, while discs hold optically encoded data. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for Power Headroom (PH) management by a wireless communication node in uplink carrier aggregation, the method comprising:
    determining an uplink power allocation across at least two independently controlled cells of a wireless communication network for a mobile entity served by the at least two independently controlled cells, subject to a total PH constraint for uplink transmissions by the mobile entity while prioritizing transmission types, the prioritizing of the transmission types comprising excepting at least one of the transmission types from a per cell PH constraint for the at least two independently controlled cells; and
    managing PH reporting for determining the uplink power allocation by each of the at least two independently controlled cells.

2. The method of claim 1, wherein the managing the PH reporting is performed by at least one of: explicit coordination between the at least two independently controlled cells, implicit coordination between the at least two independently controlled cells, or configuring PH reporting from the mobile entity by at least one of the at least two independently controlled cells.

3. The method of claim 2, wherein one of the at least two independently controlled cells is a primary cell, and another of the at least two independently controlled cells is a secondary cell.

4. The method of claim 3, wherein the managing the PH reporting is performed by explicit coordination between the at least two independently controlled cells, and further comprising the primary cell defining a maximum uplink power value for the secondary cell.

5. The method of claim 4, further comprising the primary cell signaling the maximum uplink power value to the secondary cell, via a backhaul.

6. The method of claim 2, further comprising performing the managing the PH reporting by implicit coordination between the at least two independently controlled cells, wherein each of the at least two independently controlled cells determines a partial PH per cell based on a PH Report (PHR) received from the mobile entity.

7. The method of claim 6, wherein the PHR comprises a maximum transmission power aggregated for all antennas of the mobile entity, and a PH per cell.

8. The method of claim 7, wherein each of the at least two independently controlled cells determines a mobile entity transmission power based on the PHR and on a defined power threshold.

9. The method of claim 7, wherein each of the at least two independently controlled cells determines a mobile entity transmission power based on the PHR and on the maximum transmission power aggregated for all antennas of the mobile entity.

10. The method of claim 6, wherein the partial PH per cell is less than a partial PH reported by the mobile entity for the cell.

11. The method of claim 2, wherein the managing the PH reporting is performed by each of the at least two independently controlled cells receiving PH control information from the mobile entity, wherein the mobile entity modifies the PH control information based on a Peak Maximum Power Reduction (PMPR).

12. The method of claim 11, wherein the mobile entity computes the PMPR based on a transmission power of at least one of the at least two independently controlled cells.

13. The method of claim 2, wherein each of the at least two independently controlled cells determines a mobile entity transmission power based on PH control information.

14. The method of claim 1, wherein the prioritizing is based on one or more of channel type, content type, or cell type.

15. The method of claim 1, wherein the prioritizing of the transmission types further comprises allocating power by transmission type for the at least two independently controlled cells.

16. A wireless communication node apparatus comprising:
at least one processor configured to: determine an uplink power allocation across at least two independently controlled cells of a wireless communication network for a mobile entity served by the at least two independently controlled cells of a wireless communication network, subject to a total PH constraint for uplink transmissions by the mobile entity while prioritizing transmission types, the prioritizing of the transmission types comprising excepting at least one of the transmission types from a per cell PH constraint for the at least two independently controlled cells, and
manage PH reporting for determining the uplink power allocation by the at least two independently controlled cells; and
a memory coupled to the at least one processor for storing data.

17. The wireless communication node apparatus of claim 16, wherein the at least one processor is further configured to perform the managing the PH reporting by at least one of: explicit coordination between the at least two independently controlled cells, implicit coordination between the at least two independently controlled cells, or configuring PH reporting from the mobile entity by at least one of the at least two independently controlled cells.

18. The wireless communication node apparatus of claim 17, wherein the at least one processor is further configured to perform managing the PH reporting by the implicit coordination for each of the at least two independently controlled cells, further comprising determining a partial PH per cell based on a PHR received from the mobile entity.

19. The wireless communication node apparatus of claim 18, wherein the at least one processor is further configured to receive the PHR comprising a maximum transmission power aggregated for all antennas of the mobile entity, and a PH per cell.

20. The wireless communication node apparatus of claim 19, wherein the at least one processor is further configured to determine a mobile entity transmission power based on the PHR and on a defined power threshold for each of the at least two independently controlled cells.

21. The wireless communication node apparatus of claim 20, wherein the at least one processor is further configured to determine a mobile entity transmission power based on the PHR and on the maximum transmission power aggregated for all antennas of the mobile entity, for each of the at least two independently controlled cells.

22. The wireless communication node apparatus of claim 17, wherein the at least one processor is further configured to perform the managing the PH reporting by each of the at least two independently controlled cells receiving the PH control information from the mobile entity, wherein the mobile entity modifies the PH control information based on a Peak Maximum Power Reduction (PMPR).

23. The wireless communication node apparatus of claim 17, wherein the at least one processor is further configured to determine a mobile entity transmission power based on PH control information for each of the at least two independently controlled cells.

24. The wireless communication node apparatus of claim 16, wherein the at least one processor is further configured to perform the managing the PH reporting by explicit coordination for one of the at least two independently controlled cells being a primary cell, further comprising defining a maximum uplink power value for another of the at least two independently controlled cells being a secondary cell.

25. The wireless communication node apparatus of claim 24, wherein the at least one processor is further configured to cause the primary cell to signal the maximum uplink power value to the secondary cell, via a backhaul.

26. The wireless communication node apparatus of claim 16, wherein the at least one processor is further configured to perform the prioritizing the transmission types based on one or more of channel type, content type or cell type.

27. The wireless communications node apparatus of claim 16, wherein the prioritizing of the transmission types further comprises allocating power by transmission type for the at least two independently controlled cells.

28. A wireless communication node apparatus comprising:
means for determining an uplink power allocation across at least two independently controlled cells of a wireless communication network for a mobile entity served by the at least two independently controlled cells of a wireless communication network, subject to a total PH constraint for uplink transmissions by the mobile entity while prioritizing transmission types, the prioritizing of the transmission types comprising excepting at least one of the transmission types from a per cell PH constraint for the at least two independently controlled cells; and
means for managing PH reporting for uplink serving cells.

29. A non-transitory computer-readable medium comprising code for causing at least one computer in a wireless communications node to:
determine an uplink power allocation across at least two independently controlled cells of a wireless communication network for a mobile entity served by the at least two independently controlled cells of a wireless communication network, subject to a total PH constraint for uplink transmissions by the mobile entity while prioritizing transmission types, the prioritizing of transmission types comprising excepting at least one of the transmission types from a per cell PH constraint for the at least two independently controlled cells, and
manage PH reporting for uplink serving cells.

30. A method for Power Headroom (PH) management by a mobile entity in carrier aggregation, the method comprising:
signaling data from a mobile entity subject to a PH constraint using uplink carrier aggregation (CA) to at least two independently controlled cells of a wireless communication network; and
providing information for managing uplink power control from the mobile entity to each of the at least two independently controlled cells, the information comprising a PH report including power management for each of the at least two independently controlled cells.

31. The method of claim 30, wherein the information comprises a maximum transmission power per cell and a PH per cell.

32. The method of claim 31, wherein the information comprises a maximum transmission power aggregated for all antennas of the mobile entity.

33. The method of claim 30, further comprising computing the power management based on a transmission power of at least one of the at least two independently controlled cells.

34. A wireless communication apparatus comprising:
at least one processor configured to:
signal data from a mobile entity subject to a Power Headroom (PH) constraint using uplink carrier aggregation (CA) to at least two independently controlled cells of a wireless communication network, and
provide information for managing uplink power control from the mobile entity to each of the at least two independently controlled cells, the information comprising a PH report including power management for each of the at least two independently controlled cells; and
a memory coupled to the at least one processor for storing data.

35. The wireless communication apparatus of claim 34, wherein the at least one processor is further configured to provide the information comprising a maximum transmission power per cell and a PH per cell.

36. The wireless communication apparatus of claim 35, wherein the at least one processor is further configured to provide the information further comprising a maximum transmission power aggregated for all antennas of the mobile entity.

37. The wireless communication apparatus of claim 34, wherein the at least one processor is further configured to compute the power management based on a transmission power of at least one of the at least two independently controlled cells.

38. A wireless communication apparatus comprising:
means for signaling data from a mobile entity subject to a Power Headroom (PH) constraint using uplink carrier aggregation (CA) to at least two independently controlled cells of a wireless communication network; and
means for providing information for managing uplink power control from the mobile entity to each of the at least two independently controlled cells, the information comprising a PH report including power management for each of the at least two independently controlled cells.

39. The wireless communication apparatus of claim 38, further comprising:
means for computing the power management based on a transmission power of at least one of the at least two independently controlled cells.

40. A non-transitory computer-readable medium comprising code for causing at least one computer to:
signal data from a mobile entity subject to a Power Headroom (PH) constraint using uplink carrier aggregation (CA) to at least two independently controlled cells of a wireless communication network, and provide information for managing uplink power control from the mobile entity to each of the at least two independently controlled cells, the information comprising a PH report including power management for each of the at least two independently controlled cells.

41. The non-transitory computer-readable medium of claim 40, wherein the code further causes the at least one computer to compute the power management based on a transmission power of at least one of the at least two independently controlled cells.

* * * * *